Aug. 28, 1956  F. R. GONSETT  2,760,892
MACHINES FOR THE MANUFACTURE OF MULTIPLE
STRAND CONDUCTOR LEADS
Original Filed Dec. 5, 1951  4 Sheets-Sheet 1

INVENTOR
FAUST R. GONSETT

BY Franklin S. Long
ATTORNEY

Aug. 28, 1956  F. R. GONSETT  2,760,892
MACHINES FOR THE MANUFACTURE OF MULTIPLE
STRAND CONDUCTOR LEADS
Original Filed Dec. 5, 1951  4 Sheets-Sheet 2

INVENTOR
FAUST R. GONSETT
BY Franklin S. Long.
ATTORNEY

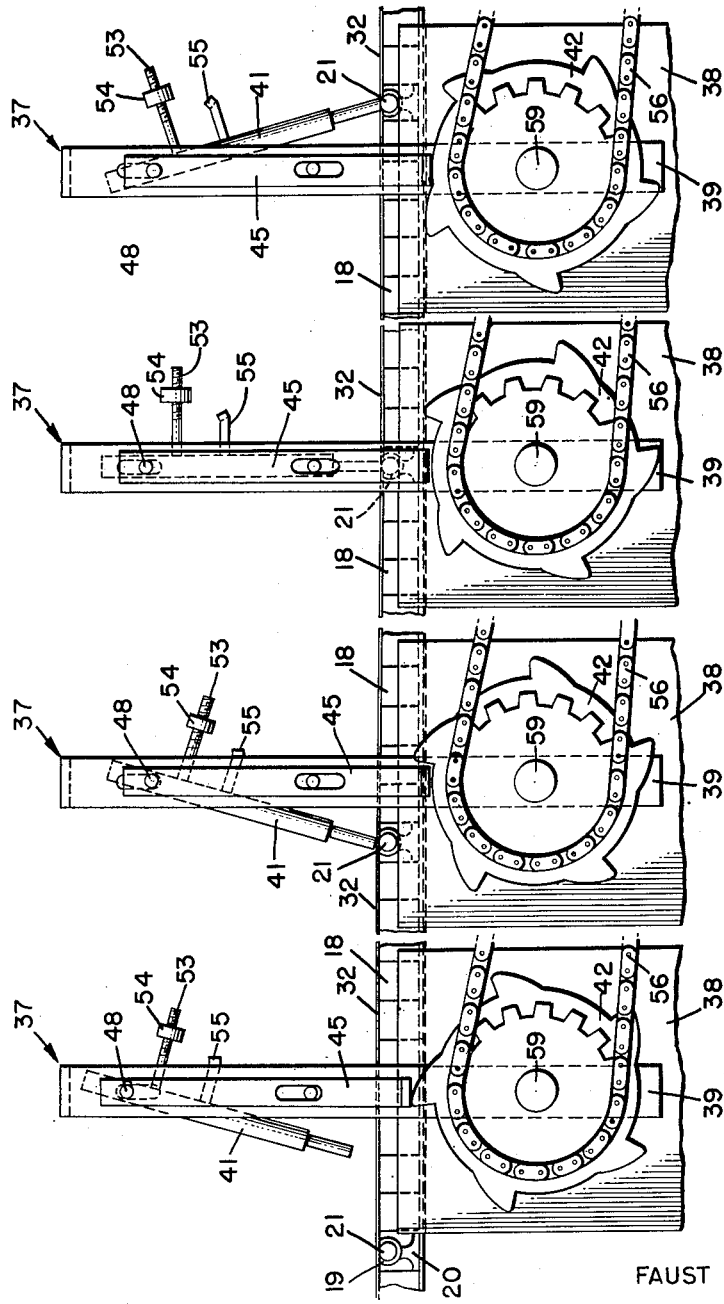

Aug. 28, 1956 F. R. GONSETT 2,760,892
MACHINES FOR THE MANUFACTURE OF MULTIPLE
STRAND CONDUCTOR LEADS
Original Filed Dec. 5, 1951 4 Sheets-Sheet 4
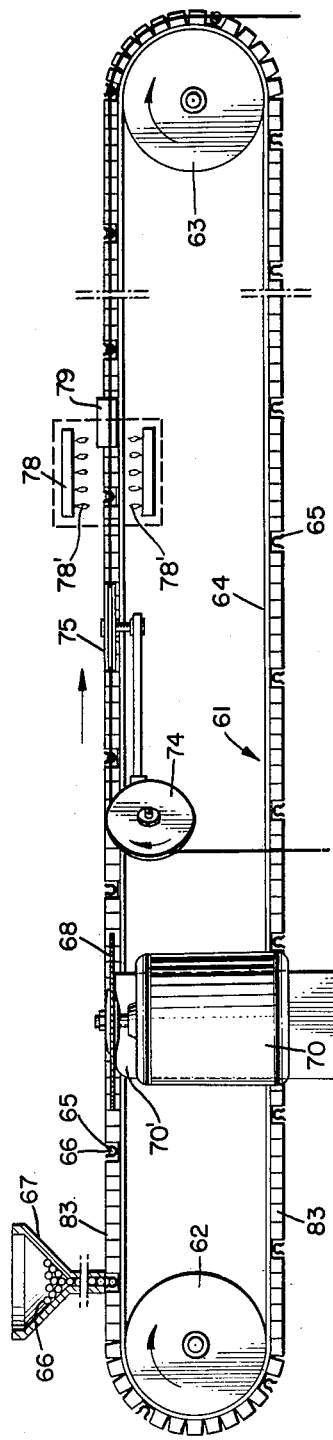
INVENTOR
FAUST R. GONSETT
BY Franklin S. Long
ATTORNEY United States Patent Office 2,760,892
Patented Aug. 28, 1956

2,760,892

MACHINES FOR THE MANUFACTURE OF MULTIPLE STRAND CONDUCTOR LEADS

Faust R. Gonsett, Burbank, Calif.

Substituted for abandoned application Serial No. 260,046, December 5, 1951. This application November 2, 1954, Serial No. 466,313

9 Claims. (Cl. 154—2.24)

This invention relates to a machine for the manufacture of multiple strand electrical conductor leads of the air insulated variety. The leads are for use primarily as conductor leads uniting a television antenna and a television receiving set.

It is an object of this invention to provide a machine which will take a pair of bare conductor wires, preferably copper, from a spool or spools of wire, heat the wires simultaneously and maintain said wires under suitable tension and pressing the heated wires successively into plastic elements in uniformly transversely spaced relation on said wires. The wires are also maintained in substantially parallel spaced relation on top of the plastic elements in one form of the invention.

The elements are of dielectric material, such as, polystyrene or any other suitable thermoplastic dielectric. The elements may be one inch long, more or less, and three sixteenths of an inch thick, more or less. The size of the elements does not appear to be critical, except that they must be of a suitable size to receive the heated wires which are to be embedded therein.

It is an object of this invention to provide a finished product comprising a multiple wire conductor lead, said wires being united in uniformly spaced relation by pieces or elements of thermoplastic material, preferably, polystyrene wherein the union of the plastic material pieces or elements are united by heated wires pressed to some extent into the end portions of the pieces while the wires are heated and maintained under tension resulting in pressure to cause the wires to sink sufficiently into the plastic pieces to make firmly united joints between the plastic elements or pieces and the wires.

Other objects and advantages will become apparent from the detailed description of the drawings which constitute a part of my application.

In the drawings:

Figs. 6, 7, 8 and 9 are respectively side elevational views representing successive views of various positions assumed in its operation by the combined heat and pressure mechanism used in pressing the bare wires into the end portions of the thermoplastic pieces or elements.

Fig. 10 is a foreshortened side elevational view partly in section of the principal parts of a modified construction wherein the end portions of the thermoplastic pieces or elements are slitted to receive the bare wires.

Fig. 11 is a plan view of the construction shown in Fig. 10.

Fig. 12 is a fragmentary side elevational view of the belt including one of the receiving clips having a slitted thermoplastic element therein.

Fig. 13 is a fragmentary sectional view taken on the line Y—Y of Fig. 11 looking in the direction indicated by the arrows.

Fig. 14 is a sectional view of a pulley taken on the line Z—Z of Fig. 11.

Figure 1:
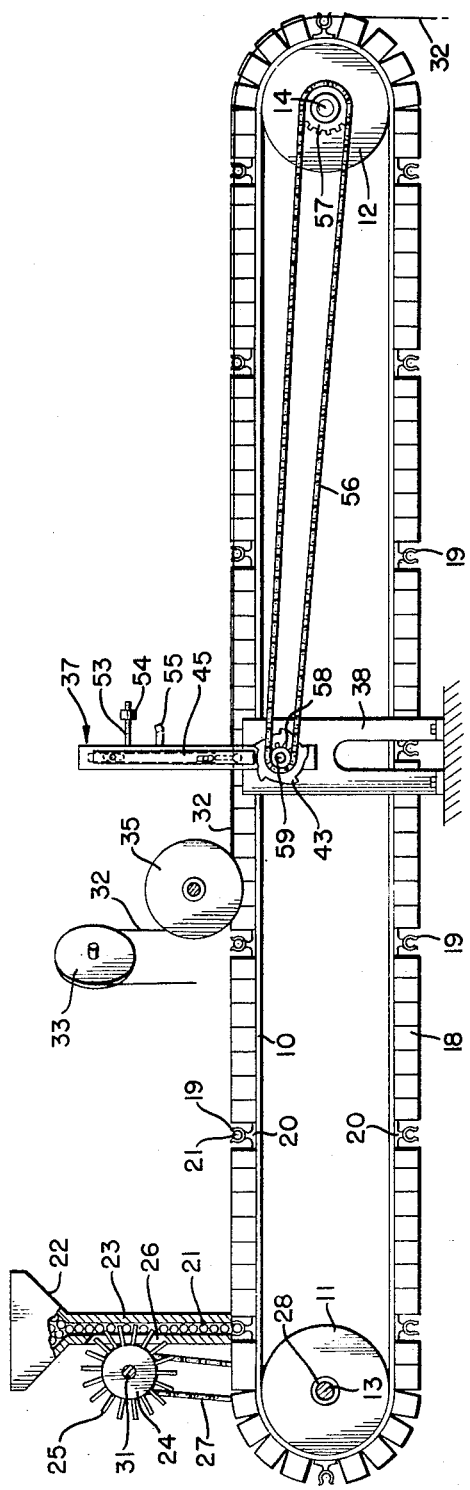
Fig. 1 is a view in side elevation disclosing the principal parts of the machine and the specific relation of those parts to each other.
Figure 2:
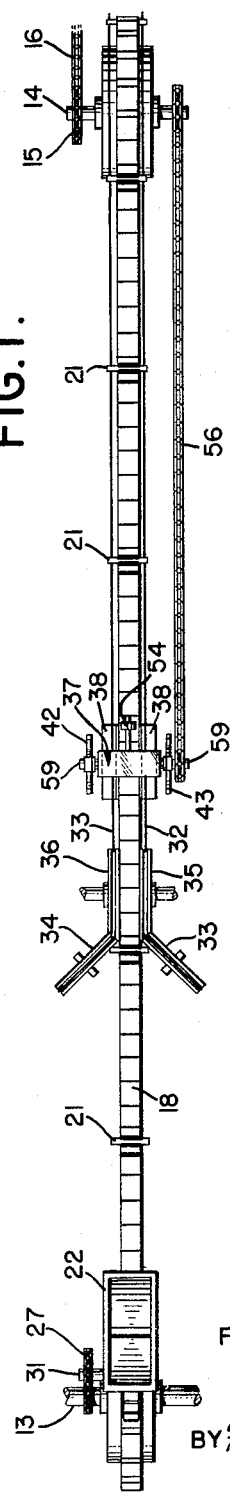
Fig. 2 is a plan view of the machine disclosed in Fig. 1.

In this machine, Figs. 1 to 14 inclusive, a chain or belt 10 is supported on a pair of pulleys 11 and 12 carried on a pair of shafts 13 and 14 which are fixed, respectively, in the pulleys 11 and 12. The shafts are supported in bearings (not shown). The pulley 12 and shaft 14 are driven by any suitable means such as a sprocket 15 and a chain 16. The pulley 11 and its shaft 13 are driven by the belt 10. The belt 10 may be made of any suitable belting material, such as laminated canvas and rubber, or any other laminated belt construction. Generally, the belt would be comparatively narrow. Assuming that the thermoplastic elements or pieces are an inch long, then the belt 10 would be slightly less than three-fourths of an inch wide. A series of blocks 18 are secured to the outside of the belt 10, as clearly shown. The blocks may be made of any suitable material such as wood or thermosetting plastics such as: phenol aldehydes, cresol aldehydes, urea aldehydes, malamineformaldehydes, analine formaldehydes and glyceryl phthalates. These blocks are secured by metallic fasteners or a suitable cement or both to the outer face portion of the belt 10.

At substantially equally spaced distances, receiving clips 19 are mounted between groups of blocks 18 on the outer face portion of the belt 10. The base 20 of each clip is substantially as wide as a block and as long as the belt 10 is wide. These clips 19 are secured to the belt by rivets or cement or both (not shown). Each clip is adapted to firmly receive and embrace a piece 21 of the thermoplastic material, such as polystyrene or any other suitable thermoplastic material.

The thermoplastic pieces or elements are contained in a hopper 22 having a chute 23 to conduct them to the clips 19.

Figure 3:
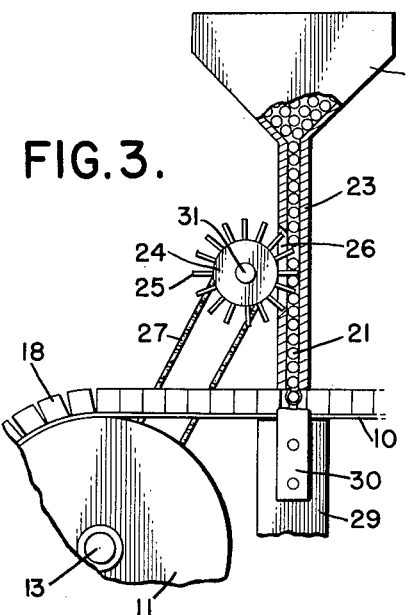
Fig. 3 is a fragmentary side elevational view, partly in section, of the force feed hopper in combination with a support for the belt just below the hopper.
Figure 4:
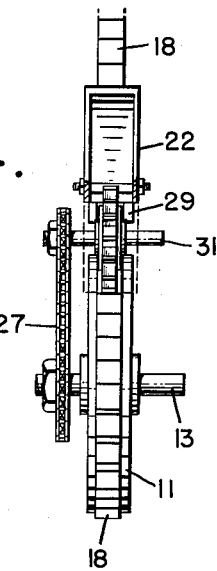
Fig. 4 is a plan view of the subject matter of Fig. 3 except that a portion of the hopper is cut away and is shown in section; furthermore the support for the belt is not shown.
Figure 5:
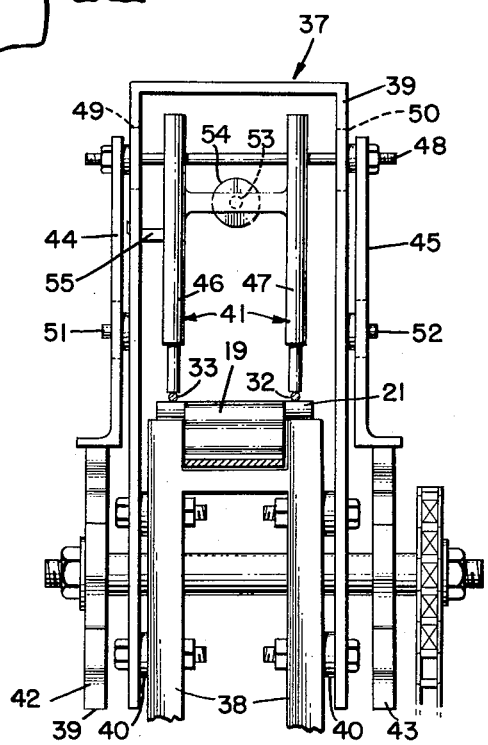
Fig. 5 is a fragmentary view in front elevation of the combined heating and pressure mechanism.

In order to insure the reception of a piece of thermoplastic by each clip 19, I have provided a force-feed mechanism comprising a feed wheel or wheels 24 having radial fingers 25 extending through a slot or slots 26 in the chute 23. The feed wheel is driven by an adjustable friction clutch (not shown) actuated by a chain 27 propelled by a sprocket 28 secured on shaft 13. The feed wheel maintains a constant downward pressure on the pieces of polystyrene through the medium of the slipping or friction clutch means. The hopper 22 and its chute 23 are supported in slight frictional engagement with the blocks 18. The supporting means for the hopper and chute are not shown on the drawings. Fig. #3 shows a support 29 for the belt 10 arranged in opposed relation to the chute 23. This support 29 cooperates with the force feed mechanism, in that, it maintains a constant position for the clips, blocks and belt as they advance along beneath the chute. The support 29 is provided with shallow upstanding guides 30, one of which is shown in Fig. 3. The shaft 31 for the feed wheel 24 is supported in suitable bearings (not shown).

The upper portions of the clips 19 are arranged in close proximity to its adjacent blocks 18 to prevent feeding a piece 21 of thermoplastic between a clip 19 and a block 18. Likewise, the blocks 18 of each group thereof are mounted on the belt 10 with adjacent blocks abutting so as to prevent feeding of the pieces 21 therebetween. The top portions of the clips are in a plane which coincides with a plane defining the top portions of the adjacent blocks when the feeding operation is taking place.

The bare conducting wires 32 and 33 are drawn from a supply (not shown) by pulleys 33 and 34 and these wires are received and guided by the pulleys 35 and 36 over the end portions of the pieces 21 of polystyrene. These pieces 21 extend transversely a suitable distance beyond both margins of the belt 100, the clips 19 and the blocks 18, so that, the heating elements 46 and 47 can be located in a slightly spaced relation from the blocks 18 and the clips 19.

The heating and pressure mechanism 37 comprises upright supporting means 38 which supports the belt, the clips and the end portions of the thermoplastic pieces 18. The wires 32 and 33 are supported respectively on the end portions of each piece 18, as clearly shown in Fig. 5. The inverted U-frame 39 is stationary and is bolted to the support 38 and is maintained in spaced relation therefrom by washers 40. The movable unit 41 can be elevated by the pair of ratchet cams 42 and 43 which engage the outside arms 44 and 45, as clearly indicated in Figs. 5 to 9 inclusive. The depending heater elements 46 and 47 have their upper ends fixed on the shaft 48. The end portions of the shaft 48 are mounted in bearings in the side arms 44 and 45. The shaft 48 is guided by slotted portions 49 and 50. The side arms 44 and 45 are slotted to receive the fixed guide pins 51 and 52. The projecting rod 53 on the shaft 48 has a weight 54 adjustably mounted thereon to swing the depending heater elements 46 and 47 forwardly when sufficiently elevated. One of the heater elements is provided with a stop 55 to prevent the heater elements from swinging too far forwardly when the heater elements are sufficiently elevated by the ratchet cams.

Each heater element is heated by an electric current arranged and applied like a heating element such as that used in soldering irons or copper bits. These heating elements are slightly grooved at their free blunt ends to take over the bare wire in a straddling manner.

The combined heating and pressure mechanism is driven by a chain 56 engaging the driven sprocket wheel 57 on shaft 14 and engages the sprocket wheel 58 on shaft 59.

Operation

In the construction disclosed in Figs. 1 to 9 inclusive, the bare conductor wires 32 and 33 are drawn, respectively, from a pair of supply spools or drums (not shown) by a pair of grooved pulleys 33 and 34, which guide the wires to the grooved pulleys 35 and 36. Each supply spool or drum is retarded by a suitable means such as a brake to maintain each wire under suitable tension as the wires 32 and 33 are drawn along by the belt or chain 10. Since the pieces 21 and the wires 32 and 33 are eventually permanently secured together by heat and pressure, hereinafter explained, the belt 10 carries and draws the connected wires along to winding spools or drums (not shown) upon which the finished product is collected for future use.

The belt or chain 10 is driven, preferably by a sprocket chain 16, and the pulley 11 and its shaft 13 are driven by the belt or chain 10. The chain 27 drives the force feed means, but since the force feed means, can only operate intermittently, a slipping friction clutch (not shown) is provided either on shaft 13 or on shaft 31 to provide for the slippage of sprocket and clutch chain 27.

As the chain or belt 10 with its blocks 18 and clips 19 moves along beneath the chute 23, a piece of thermoplastic 21 is forced into one of the clips 19 when in position below the chute 23. The belt or chain 10 and its blocks and clips are supported by the support 29, Fig. 3, during the instant of time when the piece of thermoplastic 21 is forced into one of the clips 19.

Each advancing thermoplastic piece has its end portions substantially in the path of the pulleys 35 and 36, and said end portions pass beneath the pulleys in a depressed position. Next the piece engages the combined guide and support 38. At the instant the piece engages the support 38, the heater has been elevated and has been swung forwardly, urged forwardly by the weight 54. At this point, the control arms 44 and 45 of the heater has dropped their lower end portions into elongated valleys between pairs of cam lobes on the ratchets 42 and 43.

Now the heater elements are pressing downwardly by gravity on the wires 32 and 33 and forcing them by heat and pressure into the end portions of the thermoplastic piece being engaged. The continued heat and pressure on the bare wires causes the thermoplastic to fuse at the points of physical contact of the heated wires and the wires sink into the heated and fused portions of the thermoplastic to make permanent joints or connections between the wires and the thermoplastic pieces. As soon as the heater is elevated by a pair of cam lobes on the ratchets 42 and 43, the wires and thermoplastic begin to cool and quickly the joints are permanently established.

A study of Figs. 6, 7, 8 and 9 successively, will enable anyone to visualize the operation of the combined heater and pressure mechanism.

Since the thermoplastic pieces 21 are united permanently to the wires 32 and 33, they are pulled out of the clips 19 at the end of the lap defined by the belt, by a winding spool, reel or drum (not shown).

In the construction shown in Figs. 10 to 14, inclusive, a chain or belt 61 is arranged horizontally and supported on two suitably spaced upright pulleys 62 and 63. The belt 61 is of special construction comprising a web 64 having thereon transversely arranged receivers or clips 65 to receive the thermoplastic pieces 66 one by one successively in the receivers, respectively. The pieces 66 are fed by gravity from the hopper 67 to the chute and, as disclosed in Figs. 1 and 3, are delivered by force feed to the clips 65. The thermoplastic pieces 66 are retained in the clips 65 by the frictional grip of the clips. Each piece 66 projects laterally beyond each side of the belt.

In order to provide kerfs or slots in each end of each piece two circular saws 68 and 69 are arranged horizontally and in the path of the projecting ends of the pieces 66. The saws 68 and 69 are located on opposite sides of the top lap of the belt 61. In plan view, saw 69 is operated clockwise by an individual motor 71 connected thereto. The saw 68 is rotated in an anticlockwise direction by a suitable motor 70 connected thereto.

Both the motors 70 and 71 and the belt 61 are provided with suitable supports 70' and 71' to maintain the projection of the ends of the pieces properly centered in the paths of the saws so that the kerfs or slots 66' will be properly centered in the ends of the pieces 66.

The supply wires or conductors 72 and 73 are guided by pulleys 74 and 75 on one side and 76 and 77 on the other side of the belt 61 into the kerfs 66' in the ends of the thermoplastic pieces 66.

Beyond the assembled wires and pieces, a heating means or oven 78 is provided to heat both the wires and the slotted projections of the pieces 66. The heating means softens the ends of the pieces sufficiently so that the ends of the pieces can be pinched or collapsed around the wires to make a permanent union or joint between the pieces and wires respectively.

In order to collapse the kerfed ends of the pieces, a shaping or forming means 79 and 80 are provided and are located partly within the oven 78 and partly beyond the exit of the oven. The forming means are provided with opposed wedge shaped recessed portions or channels 81 and 82. These recesses or recessed portions or channels 81 and 82 are tapered both longitudinally and transversely, thereby providing a large portion or mouth portion for the initial reception of the heated kerfed ends of the pieces respectively. As the pieces are propelled through the forming means, by the belt, the kerfed heated ends of the pieces are gradually collapsed and pressed or pinched together about the wires, respectively.

In view of the fact that the combined shaping and uniting means 79 and 80 are partly within the oven, said means is heated to some extent to facilitate the uniting of the wires and pieces. The union of the wires and pieces is permanent.

The blocks 83 on the belt 61 are substantially as tall as the receivers 65, and said blocks prevent the escape of the pieces 66 from the feed means except when a receiver 65 is in alignment with the exit of the hopper chute.

The whole machine except the saws is propelled by the sprocket wheel 84 which is connected with a suitable source of power supply.

It is to be noted that the heating and uniting of the wires and pieces takes place while the wires and pieces are advancing through the heating means or oven 78 and the shaping means 79 and 80. Both the wires 72 and 73 and the ends of the plastic pieces are heated simultaneously in the oven 78.

Although the drawings show gas flames 78' for heating purposes, it is contemplated that an electrical heater (not shown) may be used.

It is further to be observed that a force feed means like that shown in Figs. 1 and 3 is to be used in the modification disclosed in Figs. 10 to 14 inclusive.

The annular receiving grooves of pulleys 75 and 77 are broad enough in their outer circumferences to receive the kerfed ends of pieces 66 which can pass into the grooves without undue distorting as illustrated in Fig. 14. The pulleys 75 and 77 are yieldably and pivotally mounted in a stationary bracket 84 by arms or links 85 and 86. The tension spring 87 connects the arms and urges the arms and pulleys 75 and 77 toward each other to facilitate the feeding or guiding of the wires, respectively, into the kerfs 66'. Furthermore, if it should happen that a plastic piece is longer or shorter than the regulation length, then the pulleys 75 and 77 could yield accordingly to accommodate any piece of irregular length.

*Operation*

This modified construction, Figs. 10 to 14 inclusive, is generally the same as that disclosed in Figs. 1 to 9, and, of course, the force feed of Figs. 1 and 3 is to be applied to the modified construction of Figs. 10 to 14. The saws 68 and 69 operate at a high speed in the direction indicated by the arrows. The guiding supports 70' and 71' guide the plastic pieces 66 so that their end portions shall be substantially centrally and longitudinally kerfed by the saws.

The guiding pulleys 75 and 77 guide the bare wires 72 and 73 into the kerfed ends of the pieces 66. If a plastic piece 66 is not of the exact contemplated length, then the pulleys can yield to properly contact the ends of the plastic pieces. Both the ends of the plastic pieces and the wires are heated by the heater 78. The kerfed ends are sufficiently heated to make them pliable so that the heated furcations can be forced together and form a joint between the wires and the respective end portions of the plastic pieces.

The advancing belt or chain 61 drags or pulls the heated plastic pieces through the wedge shaped grooves 81 and 82 of the shaping and compressing elements 79 and 80. The forward ends of the elements 79 and 80 are located in the heater 78 so that the elements 79 and 80 are constantly in a heated condition so that a permanent union or joint can be made between the plastic pieces 66 and the wires 72 and 73 which constitutes the finished product comprising a multiple wire air insulated conductor lead.

It is to be noted that the thermoplastic elements and the bare wires are not a part of my machine but are materials worked on and manipulated by my machine.

It is contemplated that a combined transmission and conveyor chain can be used instead of a so-called belt. The force feed mechanism may vibrate during the operation of the machine. This is not objectionable but, on the contrary, aids the feed by shaking the thermoplastic elements or pieces into suitable positions. The force feed is also aided by the force of gravity because of the upright position of my force feed mechanism.

It can now be readily understood that I have produced a machine requiring the use of low temperatures to form the union between the copper wires and the thermoplastic elements. The temperature of the wires is approximately 300 to 400 degrees F. This substantially continuous operation at low temperatures is deemed to be a very desirable quality and spells continued success, as well as, mass production at a low cost.

This application is a refiled one plus additional information and is a substitute for application Ser. No. 260,046 by Faust R. Gonsett, filed December 5, 1951, now abandoned.

Having fully disclosed my invention, what I claim is:

1. A machine for the manufacture of multiple strand conductor leads of the air insulated variety, said machine comprising a combined conveying and transmission belt, means to drive said belt, spaced supported pulleys to support said belt, a series of groups of rectangular blocks on said belt arranged with adjacent of said blocks abutting, a series of spacer element receiving means on said belt, a group of said blocks being interposed between pairs of said receiving means, a force feed mechanism to feed plastic spacer elements forcibly into said receiving means, means to guide bare wires along the end portions of the plastic elements, and mechanism to substantially simultaneously heat limited portions of the wires and end portions of the plastic elements whereby the wires are connected to the said plastic elements by a partial fusing of said elements about said wires.

2. A machine for the manufacture of multiple strand conductor leads of the air insulated variety, said machine comprising a combined conveyor and transmission belt, a pair of upright spaced pulleys supporting said belt in substantially a horizontal position, a series of spacer element receiving clips secured to the outer side of said belt, a series of rectangular blocks also secured on one face portion thereof to the outside of the belt, there being a group of said blocks interposed between adjacent of said clips, a force feed means arranged above said belt to feed thermoplastic elements downward successively into said clips as the upper lap of said belt is advanced beneath said force feed means, wire engaging pulleys arranged to train and guide bare wires longitudinally into engagement with the end portions of the elements in said clips, combined localized heating and pressure means to substantially simultaneously heat portions of the wires engaged by the elements and also heat limited end portions of the plastic elements engaged by said clips and to press said wires into said plastic elements while heating, said combined heating and pressure means comprising an upright frame positioned astride of the belt in combination with a base frame, said base frame constituting a supporting means for the upper lap of the belt and also for the end portions of the thermoplastic elements, the upright frame being supported by and fastened to the base frame, heater elements depending from the upright frame and being pivotally and slidably mounted on said upright frame, means to intermittently elevate and release said heater elements, gravity means to swing said heater elements forwardly to meet and engage the bare wires whereby said bare wires may be forced into the end portions of the plastic elements by the application of heat and pressure.

3. A machine for the manufacture of multiple strand conductor leads of the air insulated variety, said machine comprising a pair of upright spaced supported pulleys, a shaft fixed in each pulley, a combined transmission and conveyer belt reeved about said pulleys, said belt having uniformly spaced receiving clips secured to the outside of the belt, a group of rectangular blocks interposed between pairs of said clips and also secured to the outside of said belt, said receiving clips being substantially as tall as said blocks, said clips having their outer edge portions substantially in a plane defined by the outer surface portions of adjacent blocks, force feed mechanism for delivering thermoplastic spacing elements into said clips as they are being advanced by said belt, driving means connecting one of said shafts with said force feed mechanism to actuate the same, feeder means for superimposing bare conductor wires onto the elements in said clips, a combined heater and pressure mechanism for joining the wires to the spacing elements on which the wires are imposed, and driving means connecting the other shaft with the combined heater and pressure mechanism to actuate the same.

4. The construction set forth in claim 3, in which said force feed mechanism comprises a hopper having a depending chute adapted to receive a multiplicity of thermoplastic elements of substantially uniform length and lying in a substantially horizontal position within said hopper and chute, said chute having an exit at its lower end and terminating in close proximity to the upper lap of the advancing belt, a feeding wheel having radial fingers thereon, said chute having a slotted portion therein defining a path to successively receive said radial fingers whereby said fingers may successively engage the thermoplastic elements and force them downwardly so that they can be received one by one respectively by the advancing clips on said belt, said feeding wheel being fixed on a horizontally supported shaft, said feed wheel and its shaft being driven by a sprocket and chain transmission having an adjustable slipping clutch interposed in said transmission whereby said force feed mechanism may be actuated intermittently as required.

5. The construction set forth in claim 3, in which two pairs of pulleys draw bare wires under tension from a pair of spools, each pair of pulleys having an upper pulley and a lower pulley, said lower pulley being positioned to train and guide bare wires onto the end portions of the spacing elements engaged by said clips.

6. The construction set forth in claim 3, in which said combined heater and pressure mechanism comprises a supporting frame located intermediate the ends of the upper and lower laps of the belt, said frame engaging the inside of the upper lap of the belt and supporting the same, said frame also engaging end portions of thermoplastic elements and supporting the same, a substantially U-shaped frame in an inverted position and extending to a position above said belt and suport, said U-shaped frame being stationary and having the lower end portions of its legs fixedly secured in outwardly spaced relation to said support, said U-shaped frame having slotted portions in the upper portions of its legs, a shaft extending transversely through said slotted portions and beyond the same and constituting extensions located on the outside of said U-shaped frame, bars suspended from said shaft extensions and pivotally connected thereto, said bars having slotted portions arranged in an upright condition, stationary guide pins secured to said U-frame and extending respectively through said slotted portions of said bars to maintain the same in an upright position, in combination with a pair of ratchet cams located beneath but in a path respectively of the lower ends of said bars, said ratchet cams being supported on a horizontally driven shaft, said shaft being located in suitable bearings in said support, said upper transversely arranged shaft having a pair of heater elements fixedly secured thereto and depending therefrom and terminating in the path of bare wires during their operation, said upper transversely arranged shaft having a rod extending laterally therefrom and fixed thereto, said rod having a weight adjustably mounted thereon whereby the heater elements may be swung forwardly to meet the advancing bare wires and a thermoplastic element, a stop on one of said heater elements and in the path of one leg of the U-shaped frame to prevent the heater elements from swinging too far forwardly before dropping by the force of gravity to unite the wires and thermoplastic elements by heat and pressure.

7. The construction set forth in claim 3, in which said force feed mechanism is arranged above said belt, and wherein said belt is provided with an upright support located beneath said belt in opposed relation to said force feed mechanism, said force feed mechanism having an upright chute with its lower end in close proximity to said belt and located directly in opposed relation to said support, said upright support being substantially in alignment with said chute, said upright support having short upstanding guide projections engaging the lateral edges of said belt.

8. In a machine for making antenna conductor leads of the air insulated variety, comprising a combined transmission and conveyor belt, said belt having thereon uniformly spaced resilient receiving pockets for receiving successively thermoplastic rods of a smooth contour and of uniform transverse dimensions, said pockets extending transversely of said belt, a series of blocks secured to the outer surface of said belt, one surface portion of each block being permanently secured to said belt, a multiplicity of blocks being disposed respectively between said spaced pockets, spaced supported pulleys engaging the inner surface of said belt and supporting the same under tension, in combination with a force feed supply magazine for the rods, said force feed being supported adjacent one pulley and in close proximity to said belt and pockets and transversely of said belt, in further combination with wire feeding mechanism located adjacent both sides of said belt and intermediate the ends of the upper stretch of said belt, said mechanism comprising a pair of grooved sheaves on each side of said belt to feed and guide bare wires into engagement with the end portions of said rods, in still further combination with a spot heating and pressure means disposed astride said belt adjacent said wire feeding mechanism adapted to unite the end portions of said rods to said bare wires during continued advance of said rods and wires, and means to drive the pulley located remote from said magazine.

9. In a machine for manufacturing multiple strand conductor leads of the air insulated variety, which embodies a horizontally extending conveyor carrying a series of clips for the reception of elongated spacer elements adapted to hold said elements extended transversely of the conveyor, means for delivering spacing elements to said clips while the conveyor is in motion, and means for feeding a pair of wires longitudinally of said conveyor into superimposed relation onto end portions of spacing elements being carried by said clips; a combined heat and pressure applying mechanism arranged over said wires, said mechanism including swinging heating elements intermittently engageable with the wires to effect heating of portions thereof during feeding of the wires, timing means for bringing said heating elements into contact with said wires where superimposed on the spacing elements, and means superimposing pressure on said heating elements when contacting said wires for impressing the heated wires into fused engagement with said spacing elements.

References Cited in the file of this patent
UNITED STATES PATENTS

| 265,130   | Nichols  | Sept. 26, 1882 |
| 2,169,063 | Wensley  | Aug. 8, 1939   |
| 2,231,910 | Henning  | Feb. 18, 1941  |
| 2,527,627 | Frankel  | Oct. 31, 1950  |